United States Patent [19]

Mellqvist et al.

[11] 4,076,002
[45] Feb. 28, 1978

[54] APPARATUS FOR THE SUPPLY OF LIQUIDS IN FINELY-DIVIDED FORM TO AN INTERNAL COMBUSTION ENGINE

[76] Inventors: Allan Mellqvist, Balzarsgatan 8, 211 36 Malmo; Thorild Nils Kristian Ewald Anderberg, Papegojvagen 3, 230 11 Falsterbo, both of Sweden

[21] Appl. No.: 677,847

[22] Filed: Apr. 16, 1976

[30] Foreign Application Priority Data

Apr. 18, 1975 Sweden ............................. 7504498

[51] Int. Cl.$^2$ ............................................. F02B 47/02
[52] U.S. Cl. ............................. 123/198 A; 123/25 R; 123/252; 123/134
[58] Field of Search ................. 123/25 R, 25 A, 25 L, 123/198 A, 25 B, 25 D, 134; 261/18 A

[56] References Cited

U.S. PATENT DOCUMENTS

| | | |
|---|---|---|
| 2,073,887 | 3/1937 | Strancke ............................ 123/25 L |
| 3,044,453 | 7/1962 | Hoffmann ........................... 123/25 B |
| 3,716,040 | 2/1973 | Herpin ............................ 123/25 R X |
| 3,767,172 | 10/1973 | Mills .............................. 123/25 R X |
| 3,965,871 | 6/1976 | Morton ............................ 123/25 L X |

*Primary Examiner*—Charles J. Myhre
*Assistant Examiner*—Ira S. Lazarus
*Attorney, Agent, or Firm*—Wenderoth, Lind & Ponack

[57] ABSTRACT

An apparatus for supplying liquids in finely-divided form to an internal combustion engine includes a liquid container, a distributor mounted.

The apparatus has a liquid container, a distributor mounted in the container for supplying ambient air to the liquid in the container, a conduit connected between the container and the intake manifold of the engine for conveying air moistened with the liquid to the intake manifold for admixture to the fuel/air mixture, and a baffle in the container for making effective the moisturization of the air.

1 Claim, 1 Drawing Figure

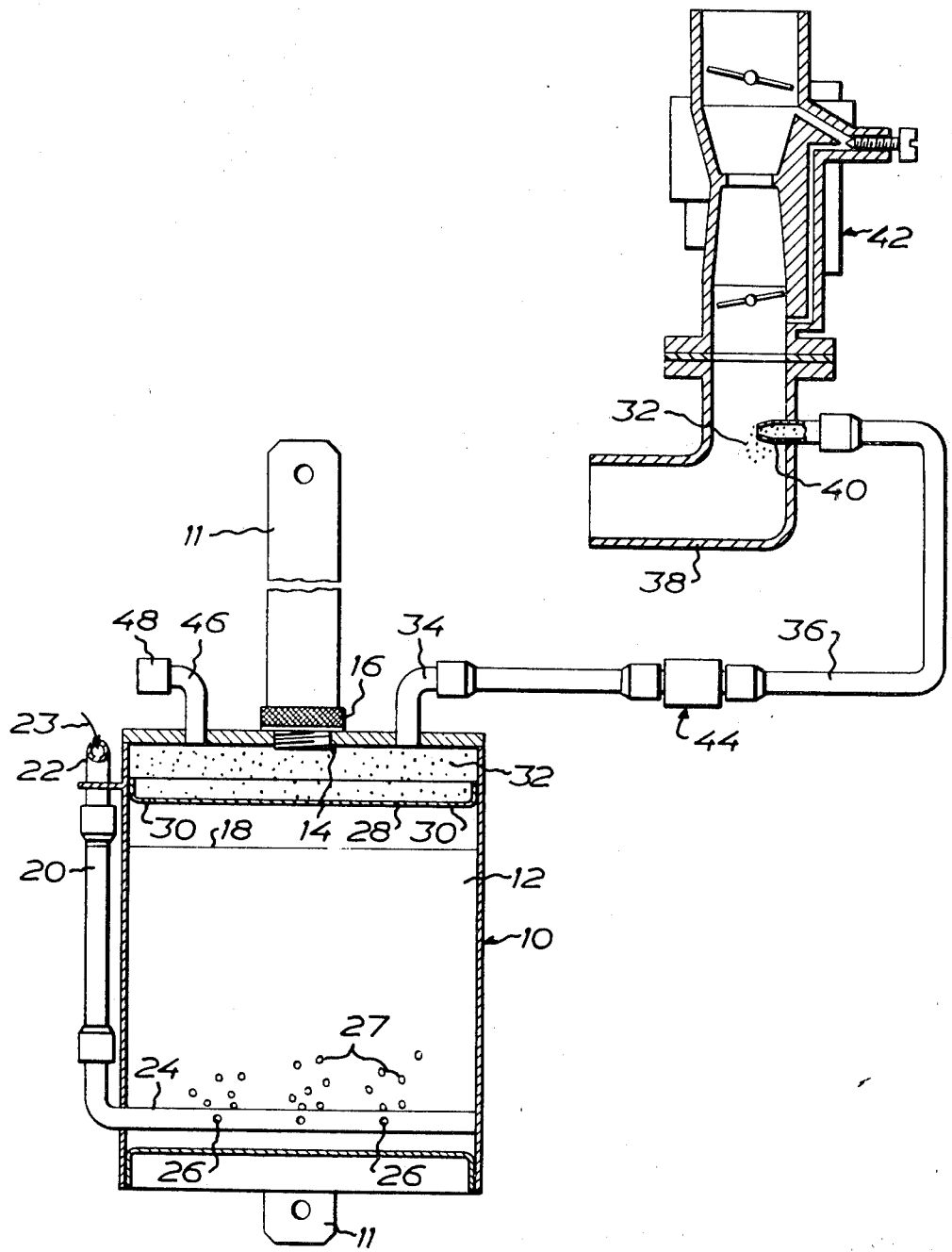

APPARATUS FOR THE SUPPLY OF LIQUIDS IN FINELY-DIVIDED FORM TO AN INTERNAL COMBUSTION ENGINE

BACKGROUND OF THE INVENTION

The present invention relates to an apparatus for the supply of liquids in finely-divided form to an internal combustion engine, primarily for producing purer exhaust gases, reducing fuel consumption and increasing the power of the engine. The apparatus includes a closed container for the liquid, a distributor in the lower region of the container, the distributor being connected to the atmosphere and having apertures for the introduction of air into the liquid in the container, and a conduit one end of which discharges into the container at the upper end thereof and a second end of which discharges into the intake manifold of the engine for conveying air moistened with the liquid to the cylinders of the engine.

In the known apparatuses of this type, the air flows freely from the distributor up through the liquid and discharges through the conduit. Such apparatuses provide very little opportunity to check the amount of liquid each air bubble, as it were, sucks in while passing through the liquid, with the result that the air supplied to the intake manifold and there mixed with the fuel/air mixture will be unevenly moisturized with resultant unevenness in its effect to provide purer exhaust gases, lower fuel consumption and higher engine power. Moreover, the free, upward flow of air or, more correctly, of the air bubbles through the liquid, entails that liquid droplets are entrained from the liquid surface and deposited on the inner wall of the conduit or drip into the intake manifold, which detracts from the contemplated effect of the moisturized air.

SUMMARY OF THE INVENTION

The object of the present invention is, in an effective manner, to regulate the moisturization of the air within the container while obviating the disadvantages disclosed in the previous paragraph.

According to the invention, the apparatus is provided with a baffle in the container between the distributor and the first end of the conduit, the baffle having narrow air passages for dividing the air and lengthening its flow-path and thereby achieving more effective moisturization of the air with the liquid.

BRIEF DESCRIPTION OF THE DRAWINGS

The invention will be described in greater detail hereinbelow with reference to the accompanying drawing which, schematically and in longitudinal cross-section, shows a particularly preferred embodiment of an apparatus according to the present invention.

DETAILED DESCRIPTION OF THE INVENTION

The apparatus shown on the drawing has a container 10 of sheet-metal which has a capacity of about one liter of an additive 12 which, in a conventional four-cylinder, four-stroke combustion engine, will last for about 4,000–4,500 Km. The container 10 is of rectangular cross-section and is to be mounted adjacent the engine. If the engine is mounted in an automobile, it is advisable to mount the container 10 on the side of the cowl panel facing the engine compartment, or on any one of the wheel housings, by means of mountings 11.

The container 10 has a filler opening 14 through which the liquid 12 is supplied and which may be closed by means of a plug 16 of plastic or the like. The liquid is filled to a maximum level 18 which can be checked in a transparent level tube 20 on the outside of the container 10. At the same time, the level tube 20 serves, via an air intake 22, as an intake manifold for ambient air 23. The level tube/intake manifold 20 is, at its lower end, connected to a tubular distributor 24 which is mounted in the lower region of the container 10 and has sparsely placed out-flow openings 26 for the air 23 flowing in via the intake 22 and the manifold 20.

The air flowing out from the out-flow openings 26 and freely flowing in the form of bubbles 27 upwardly through the liquid 12 is moistened during this flow by the liquid and arrives subsequently at the surface 18. Immediately above the surface 18 there is a baffle 28 preferably a plate of sheet-metal or plastic, which is fixedly mounted in the container 10 and covers the entire cross-sectional area of the container. In order to divide the partially moistened air coming from the liquid and to lengthen its flow-path to achieve the greatest possible total moisturization, there are provided in the baffle 28, adjacent the outer circumference, thereof narrow air passages in the form of elongated narrow slits 30 which thus function as a sort of combined distributor and throttle.

The now fully moistened air 32 flows, or more precisely, is sucked out from the container 10 via a connection 34 and a conduit 36 and is conveyed to a nozzle 40 of suitable size which is mounted on the intake manifold 38 of the engine and placed downstream of the carburetor 42 of the engine. The moistened air 32 is mixed in the intake manifold 38 with the fuel/air mixture from the carburetor 42 and is conveyed, together with the fuel/air mixture, to the cylinders of the engine (not shown). The size of the nozzle 40 is dependent upon such factors as the number of cylinders, their volume and the type of carburetor. It should be observed that the apparatus does not require, for its function, the presence of a carburetor, but can be used to just as great an extent and with just as good a result in a fuel-injection engine. However, in such an instance, the nozzle 40 is placed closer to the cylinders. Similarly, the number of nozzles 40 can be varied in dependence on the construction of the engine, for example, the number of carburetors, the number of ports therein and the number of intake manifolds. As a preparatory measure therefor, there is provided in the upper region of the container 10 yet another connection 46 similar to the connection 34, but when this connection 46 is not in use it is closed by means of a plug 48 of plastic or the like.

A non-return valve 44 of conventional design may be provided in the conduit 36 to prevent back-flow or back-pressure therein.

The invention should not be considered as restricted to that described above and shown on the drawing, many modifications being possible within the spirit and scope of the appended claims.

What we claim and desire to secure by Letters Patent is:

1. In an apparatus for supplying liquid in finely divided form to an internal combustion engine, said apparatus being of the type including a closed container having therein liquid, apertured distribution means in a lower region of said container for introducing air into said liquid in said container, whereby said air passes upwardly through said liquid and is moistened thereby, said air entraining therein said liquid in finely divided form, and conduit means having a first end connected to said container at the upper end thereof and a second end discharging into the intake manifold of an internal combustion engine for conveying entrained liquid to said engine, the improvement comprising:

baffle means, fixedly positioned within said container at a position adjacent a maximum upper level of said liquid, for dividing said air and lengthening the flow path thereof through said liquid, said baffle means comprising a plate extending across the entire cross-sectional area of said container, said plate having elongated slits therein at positions adjacent the outer periphery thereof, the remaining area of said plate being impervious to the passage therethrough of said air, whereby the positions of said elongated slits cause said flow path of said air through said liquid to be lengthened, thus maximizing the effective entrainment of said liquid by said air, and whereby the dimensions of said slits cause said air to be divided.

* * * * *